April 8, 1941.  R. C. BOYD  2,237,404
SILENCING STOP
Filed Feb. 14, 1939

INVENTOR
Robert C. Boyd
By Green & McCallister
His Attorneys

Patented Apr. 8, 1941

2,237,404

UNITED STATES PATENT OFFICE 2,237,404

SILENCING STOP

Robert C. Boyd, Louisville, Ky., assignor to American Radiator & Standard Sanitary Corporation, a corporation of Delaware Application February 14, 1939, Serial No. 256,263

6 Claims. (Cl. 251—159)

My present invention relates to valve mechanisms adapted to be interposed for control purposes in water lines or pipes, and more particularly to a valve which has the dual function of flow control and silencing action. The valve will hereinafter be termed a silencing stop, valve mechanisms of this general type being termed stops in the industry.

The flow of water or other liquid through a pipe or conduit is invariably accompanied by objectionable noise. The amount of noise involved depends upon a number of factors such as the nature, pressure and temperature of the liquid, its velocity and volume, the size and character of the pipe through which it passes, and other recognized contributing factors. It is generally believed that pressure and rate of flow are the major factors contributing to such noise. Where the pipes form part of a closet or lavatory system, the noise is particularly objectionable and undesirable and many efforts have been made in the past to reduce or eliminate such noise. As above indicated, there appears to be something inherent in the passage of a liquid through a pipe which gives rise to noise.

Such previous attempts as have been made to reduce noise in connection with closet and lavatory pipes have generally taken the form of what is known as a stop. This stop is merely a valve inserted in the line at a suitable location, sometimes adjacent the fixture involved and sometimes remote therefrom, which merely acts like an ordinary water valve to cut down the flow of water. While theoretically a reduction in the rate of flow through a pipe should cut down the noise of the passage of the liquid therethrough, existing stops actually increase the noise and make it even more objectionable and apparent than it was before. This, I believe, is at least in large part due to the fact that ordinary flat or cylindrical valves and valve seats have been utilized in such stops, and therefore when the valve is throttled down to reduce the flow of water a peculiar whistling or singing noise results as the water passes through the reduced throat of the valve. Hence, such stops have been used to control rate of flow of water only and the question of noise has been given up insofar as these stops are concerned. As a result, practically all bathroom fixtures are characteristically noisy and the common use of stops emphasizes rather than minimizes the difficulty.

One of the objects of the present invention is to produce what I have herein termed a silencing stop, which, when interposed in a water pipe or other liquid carrying conduit or line, has the dual advantage of providing requisite control over rate of flow and at the same time acts to quiet the passage of liquid through the pipe and stop.

Another object of the invention is the provision of a silencing stop adapted to be interposed in a water or other liquid carrying pipe or line which is simple in construction and not unduly expensive to manufacture, and which at the same time will control rate of liquid flow without giving rise to objectionable noises as the liquid passes therethrough.

An additional object of the invention resides in a silencing stop in which the flow characteristics of incoming water are altered to give the desired flow values on the discharge side, while at the same time eliminating noises due to the flow of liquid through the stop.

Still another object of the invention resides in the provision of a silencing stop wherein the water regulating passage is free of metal-to-metal surfaces and wherein desired flow control can be readily effected while at the same time preventing the generation of noises in the stop.

A further object of the invention resides in the provision of a silencing stop which prevents water reversals and which is characterized by having a water control passageway of annular frusto-conical configuration defined by one metallic and one flexible non-metallic surface.

Other and further objects and advantages reside in the various details of structure hereinafter described, as well as in various other objects and advantages which will be understood by those skilled in this art.

In the accompanying drawing wherein I have illustrated two embodiments of my present invention and wherein like numerals designate corresponding parts throughout the various views.

Referring first to Figs. 1 to 4, inclusive, which illustrate that form of the invention which is adapted to be interposed in a straight pipe or between pipes disposed at an angle of 180° to each other, the silencing stop is designated as a whole in these figures by the numeral 10. The stop has a bowl-shaped body portion 11 at one side of which is an inlet portion 12 and at the other side of which is an aligned outlet portion 13.

Figure 2:
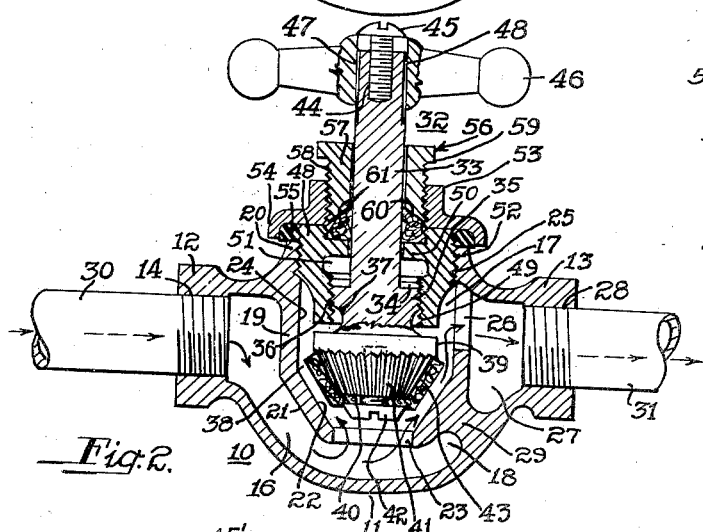
Fig. 2 is a vertical sectional view through the silencing stop of Fig. 1.
Figure 3:
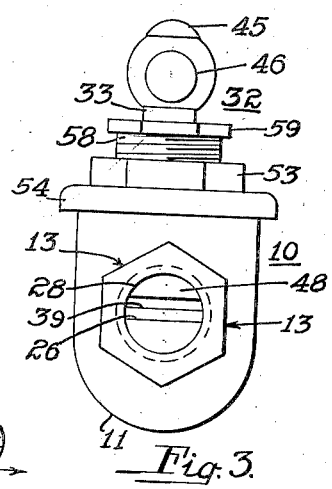
Fig. 3 is an end elevational view looking from right to left in Fig. 2.

The inlet element 12 is provided with a threaded aperture 14 therethrough, and on its outer surface is provided with wrench flats 15, nut fashion. Communicating with the inlet aperture 14, and extending downwardly and inwardly therefrom, is a more or less arcuate water passageway 16 which, as noted particularly from Fig. 2, is not directly in communication with the interior cylindrical chamber 17 of the body, and which also terminates in a pocket-shaped recess 18 formed in the metal of the body, and the end of which prevents further flow of water or liquid in that direction.

The arrangement is such that a baffle or wall 19 is formed between the initial portion of the water passage 16 where it joins inlet aperture 14 and the interior cylindrical central chamber 17 of the body 11, and this wall 19 is unitary with the upper cylindrical portion 20 of the body, extending first vertically downwardly and then inwardly and downwardly at an angle so as to provide a sloping or beveled surface 21, which forms a part of the outer surface of the inner frusto-conical annular surface 22 of the flow control passage. A central round opening 23 gives communication between the interior of the control passage and the contiguous portion of the passage 16.

Figure 1:
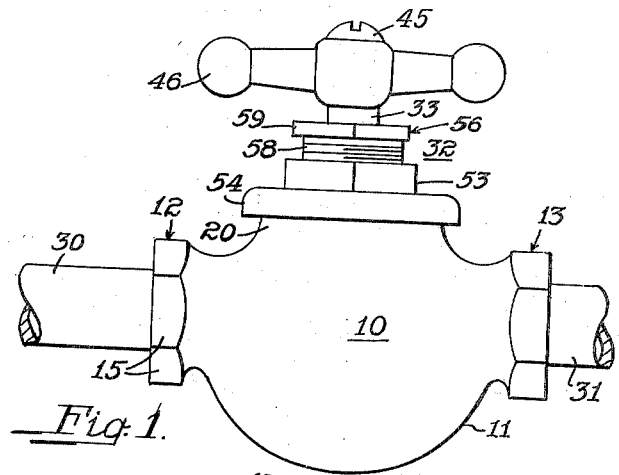
Fig. 1 is a side elevational view of a silencing stop adapted to be interposed in a straight pipe.
Figure 4:
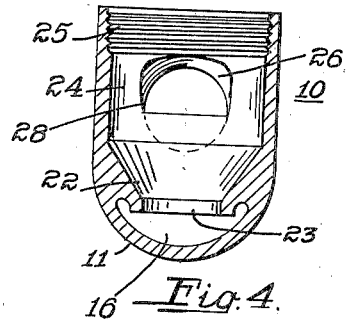
Fig. 4 is a transverse section through the body of the stop minus the valve and its accoutrements shown in Fig. 2.

The central part of the interior of the body is in the form of a smooth cylindrical surface 24 which has a superjacent interiorly threaded extension 25 and a subjacent portion which is constituted of the surface 22 aforesaid. In this smooth cylindrical surface 24 a slot or opening 26 is provided which is preferably substantially rectangular in shape but dome-shaped at its top (see Fig. 4). This slot 26 communicates directly with an enlarged chamber 27 which lies intermediate the slot 26 and the outlet opening 28 in outlet element 13 which is similar to inlet element 12. It will be noted in particular from Fig. 2 that this chamber 27 likewise terminates in a more or less pocket-shaped portion, but that there is a substantial thickness of metal—indicated at 29—between the same and the pocket-shaped recess 18 heretofore described. An inlet pipe or conduit 30 is adapted to be threaded into the inlet element 12, and an outlet pipe or conduit 31 is adapted to be threaded into the outlet element 13, as indicated in Figs. 1 and 2.

A valve assembly, designated as a whole by the numeral 32, cooperates with the body above described for flow control and silencing purposes. This assembly is made up of a stem 33 which is of uniform cylindrical shape for a substantial portion of its length but which near the lower end thereof abruptly widens to provide an annular shoulder 34 superjacent the enlargement 35 which is provided with exterior screw threads 36, below which the enlargement 35 contracts to form a smaller intermediate portion 37 which is connected to enlargement 35 and to a subjacent frusto-conical head 38 by means of the concavely curved surfaces shown. The conical head 38 has a disk-like upper portion 39 which is smooth and cylindrical but terminates in a sharply converging portion which is provided with a plurality of serrations or grooves 40, each of which is widest and deepest at its top and tapering both in width and in depth toward the bottom. The extreme bottom of the head 38 is provided with a threaded aperture 41 which is adapted to receive the shank of screw 42, the head of which serves to secure a flexible washer, membrane or the like 43, preferably of leather, on and in contact with the grooved surface. The upper end of the stem 33 is also tapped out to provide a threaded opening 44 in which the shank of the screw 45 is adapted to be—and is—received, the head of which maintains the handle 46 upon the upper end of the stem, the outer uppermost portion of which is provided with grooves or serrations 47 to prevent relative rotational slippage of the handle on the stem. Handle 46 has a central roughened or grooved aperture 48 cooperating with grooves 47.

Referring further to Fig. 2, it will be observed that a sleeve-like member 48' is provided and that this member has threads 49 interiorly of its lower end. These threads are adapted to cooperate with the threads 36 on the exterior of the enlarged portion 35 of stem 33, and near its upper inner end this member 48' is provided with an inwardly extending annular flange 50, the central opening through which is just sufficiently large to accommodate the stem 33. This arrangement provides an annular chamber 51 below flange 50 and above annular shoulder 34, thus providing space for opening and closing or otherwise suitably regulating the device. The upper exterior threads 52 on member 48' are adapted to cooperate with the internally threaded cylindrical portion 25.

A cap member 53 is provided which has an interiorly threaded aperture through the center thereof and a depending annular flange or skirt 54 at its lower end and which, when the device is fully assembled, overlies the upper end of the body member 10. To make a water-tight connection an annular washer or packing 55 of rubber, fibre or other suitable material is interposed, as shown. Passing down through the central interiorly threaded opening of the cap member 53 is a gland 56 which consists of a cylindrical body portion 57 exteriorly threaded at 58 and terminating in a polygonal head 59, and which in turn is provided with a central aperture unthreaded in contrast to the apertures previously mentioned, and of sufficient size just to accommodate passage of the cylindrical portion of the stem 33.

The under side of the gland 56 is undercut, as indicated at 60, thereby providing a space or chamber for packing material, which is indicated at 61 and which is preferably of conventional nature. The relationship of the parts, when they are fully assembled, is clearly shown in Fig. 2 in which the device is in its so-called open position, i. e. the stem 33 has been raised by right-to-left turning movement of the handle 46 so that the annular frusto-conical water control passage is sufficiently open to allow the desired volume of water to pass through the device.

Water entering through pipe or conduit 30 travels through the arcuate passageway 16, recoils from the pocket-shaped recess 18 and then passes upwardly through the aperture 23 in contact with the beveled surface 22 and the outer surface of the washer or membrane 43, after which it gains access to the cylindrical chamber 17 and thence flows through outlet chamber 27 and outlet pipe or conduit 31, but in its passage through the device, depending upon the particular setting of the valve stem, the flow characteristics of the water have been changed to those desired, i. e. the water has been reduced in volume or adjusted to the required rate of flow and at the same time the shape, nature and character of the parts and the combination absolutely prevent the generation of objectionable noises inherent in previously known stops. While I do not wish to be limited thereto, I believe that the non-metallic element 43 in the combination set forth provides the resulting quietness of operation, and these results have been fully confirmed by actual tests.

Figures 5, 6:
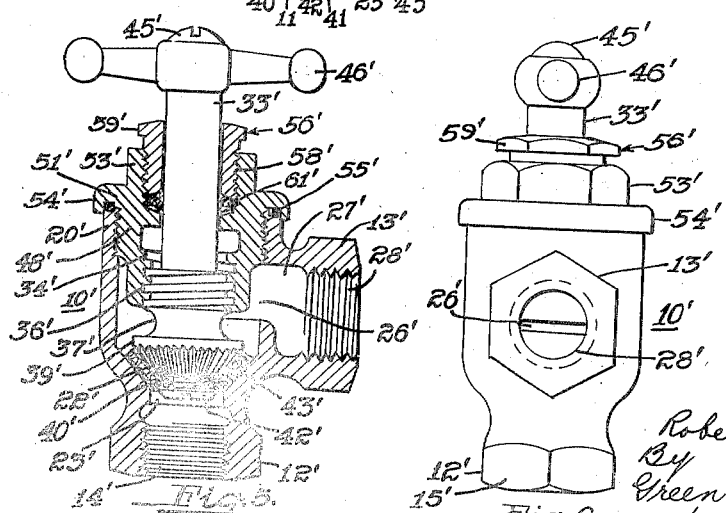
Fig. 5 is a vertical sectional view taken through a modified form of stop which is adapted to be interposed between two pipes at right angles to each other.
Fig. 6 is an end elevational view of the silencing stop of Fig. 5 looking from right to left in that figure.

In Figs. 5 and 6 a modified form of silencing stop is illustrated which is adapted to be utilized in connection with right-angled pipes, although it will be appreciated that by simple changes in the stop it could be used in connection with pipes converging at 30°, 60° or other angles than 90°. For illustrative purposes the stop of Figs. 5 and 6 has been shown in closed position, i. e. in such position that no water can pass through the stop, and this is merely for the purpose of showing the position of the parts under such conditions. For the most part, the structure of the stop of Figs. 5 and 6 is the same as or similar to Figs. 1 to 4, inclusive, and it will therefore be unnecessary to describe such parts in detail. The use of numerals bearing a prime mark indicates the conformity with parts previously described.

It will be noted that the body 10' is of somewhat different form as compared to body 10 and that it has an inlet end 12' on its under side corresponding functionally to the portion 12 of Fig. 2 and similarly provided with an interiorly threaded inlet opening 14' for the reception of an inlet pipe (not shown). The body 10' has a frusto-conical metallic surface 22' between which and the flexible leather washer 43' water is adapted to pass from the inlet portion 12' in a manner which will be clearly understood from what has preceded. When the valve is either partially or fully opened, the annular frusto-conical chamber thus produced, herein termed the flow control passage, receives water from the inlet and passes the same into outlet chamber 27' and thence through the threaded opening 28' in the outlet portion 13' of the stop.

The upper end 20' of the body 10' is interiorly threaded and cylindrical in nature, as before, and is adapted to accommodate the exteriorly threaded portion of the sleeve-like member 48', which has preferably unitarily formed therewith an upwardly extending hollow boss 53' and a depending annular flange 54' which overlies the upper edge of the stop body and between which and the body is disposed a ring of packing material 55' to produce a water-tight connection. The gland 56' is threadedly received within the hollow boss 53' which is interiorly threaded for this purpose, and packing material 61' is disposed between the gland and the sleeve-like member. Otherwise, the construction and operation will be appreciated from the more detailed consideration of Figs. 1 to 4, inclusive, and it is to be understood that other forms of the device may be resorted to without departing from the principles or spirit hereof.

In use not only can the rate of flow of water be throttled down in the stop to deliver water at a rate consonant with the optimum operation of sanitary fixtures but the water is caused to follow a tortuous and somewhat S-shaped path through the stop. It will also be noted that the water is directed upwardly prior to its horizontal discharge and that the water is turned through an angle of 90° just before discharge from the stop. The water in its upward passage enters the small end of the flow control passage, which may be considered funnel-shaped, and passes into an outlet opening which is somewhat larger than the actual internal diameter of the outlet portion of the stop or the outlet conduit therein.

It should also be noted that the flexible leather washer 43 or 43' is fastened at only one point and that it is peripherally free to move in response to air and/or water movements and pressures. If, for any reason, a negative pressure should occur in the inlet side of the stop or at other locations or if a flow reversal should commence, then the member 43 or 43' is capable of closing the flow control passage as will be understood. Of course, the stop may be set in any of its various possible positions between and including a fully closed and a fully opened position. All these facts and considerations fall within the purview of the invention and contribute to the usefulness and versatility thereof.

It will be appreciated that the various details of structure hereinbefore described and illustrated in the drawing may be varied to suit circumstances or the requirements of any particular installation, and so long as the device is capable of controlling volume or rate of flow of liquid while simultaneously minimizing or eliminating noises due to the passage of such liquid through the device or through the contiguous pipes, the same is deemed to be a part of my invention and is intended to be covered by the appended claims. The stop may, of course, be made of various materials and in various sizes, and in neither particular is the invention in any way restricted. Depending upon the actual rate of flow of liquid and the pressure thereof under any given set of conditions, the strength, proportions and precise form which the present invention may take shall be considered broad enough to cover all practical commercial ranges of volumes and pressures. Where the liquid being handled is of a corrosive nature, the stop and the pipes may be made of suitable corrosion resisting material. It is not to be understood that the invention is limited to any particular temperature considerations because while the stop is particularly designed for handling water at the ordinary temperatures at which water is supplied for domestic purposes nevertheless the invention comprehends stops which are capable of handling liquids at any temperatures and for any purposes whether domestic or industrial.

Having thus described my invention, what I claim as new and desire to secure by Letters Patent is:

1. A silencing stop comprising a bowl-shaped body having a central cylindrical chamber the lower end of which terminates in a beveled annular metallic surface spaced from the bottom of the body and communicating therewith and the upper end of which terminates in an interiorly threaded portion, the said cylindrical chamber being provided with a slot on one side thereof communicating with an outlet portion and having an inlet portion which communicates with a central aperture in the beveled metallic surface via an arcuate connecting passage, a valve assembly in said cylindrical chamber and having threaded engagement with the interiorly threaded portion aforesaid, the valve assembly having a grooved frusto-conical lower end provided with a flexible non-metallic washer-like member, and means to vary the distance between the flexible member and the beveled metallic surface for flow control and quieting purposes.

2. A silencing stop of the character described comprising a bowl-shaped body member having a liquid inlet and a liquid outlet and passageways tortuously connecting the same, a valve assembly adapted to be received in the body member and with the same to define a flow control passage between said inlet and said outlet, said flow control passage being bounded by a metallic surface forming a part of the body member and a flexible non-metallic surface forming a part of the valve assembly, and means for raising and lowering the non-metallic surface to increase and decrease the size of the flow control passage, said non-metallic surface overlying a grooved frusto-conical stem end to which it conforms but from which it is capable of moving in response to decreased pressure conditions.

3. A silencing stop as set forth in claim 2 wherein the flow control passage is of annular frusto-conical form and has a substantial vertical height.

4. In a silencing stop, a valve stem terminating in a grooved frusto-conical metal surface having a substantial seat as compared with its diameter, a flexible non-metallic washer-like member capable of conforming to said seat and of similar size and means for securing the washer-like member to the stem seat without interfering with the capacity of such member to move toward and away from such seat.

5. Structure set forth in claim 4 in combination with a stop body having a central chamber in which the frusto-conical terminal stem surface is disposed, a frusto-conical body surface bounding the lower end of such chamber and with said terminal stem surface forming a frusto-conical annular flow control passage, means for introducing water into the smaller end of said flow control passage and for discharging the same via a body slot communicating with the larger end of said flow control passage, said stem being adapted to be raised and lowered to increase and decrease the size of such flow control passage.

6. Structure set forth in claim 4 in combination with a stop body having a central chamber in which the frusto-conical terminal stem surface is disposed, a frusto-conical body surface bounding the lower end of such chamber and with said terminal stem surface forming a frusto-conical annular flow control passage, means for introducing water into the smaller end of said flow control passage and for discharging the same via a body slot communicating with the larger end of said flow control passage, said stem being adapted to be raised and lowered to increase and decrease the size of such flow control passage, and the flow control passage being of substantial vertical extent and depressed to lie chiefly below a plane connecting the axes of the body inlet and outlet openings.

ROBERT C. BOYD.